Sept. 27, 1955     H. A. MICHAELIS     2,718,854
DECK CONSTRUCTION FOR BAKE OVENS AND THE LIKE
Filed April 27, 1951     3 Sheets-Sheet 1
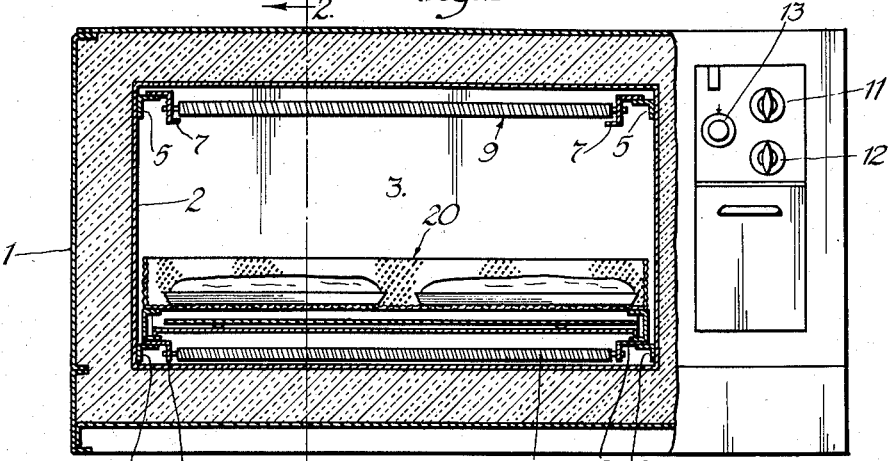
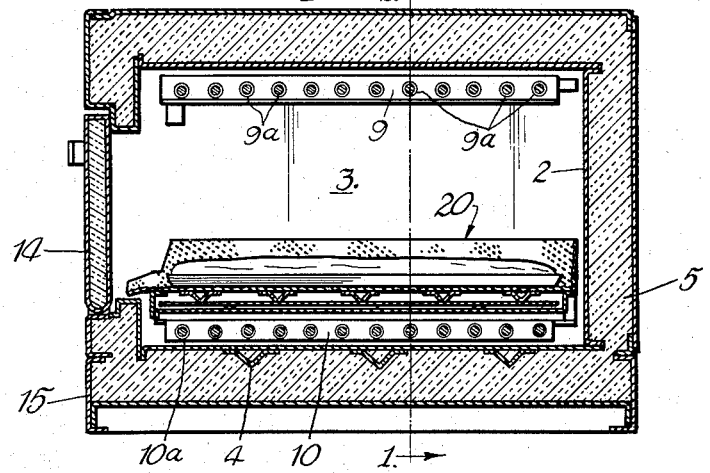
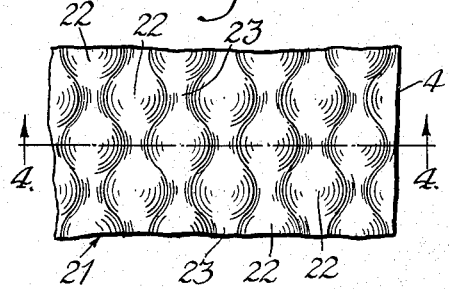
Inventor
Harold A. Michaelis
by Andrew S. Hubbard
Atty.

Sept. 27, 1955  H. A. MICHAELIS  2,718,854
DECK CONSTRUCTION FOR BAKE OVENS AND THE LIKE
Filed April 27, 1951  3 Sheets-Sheet 2
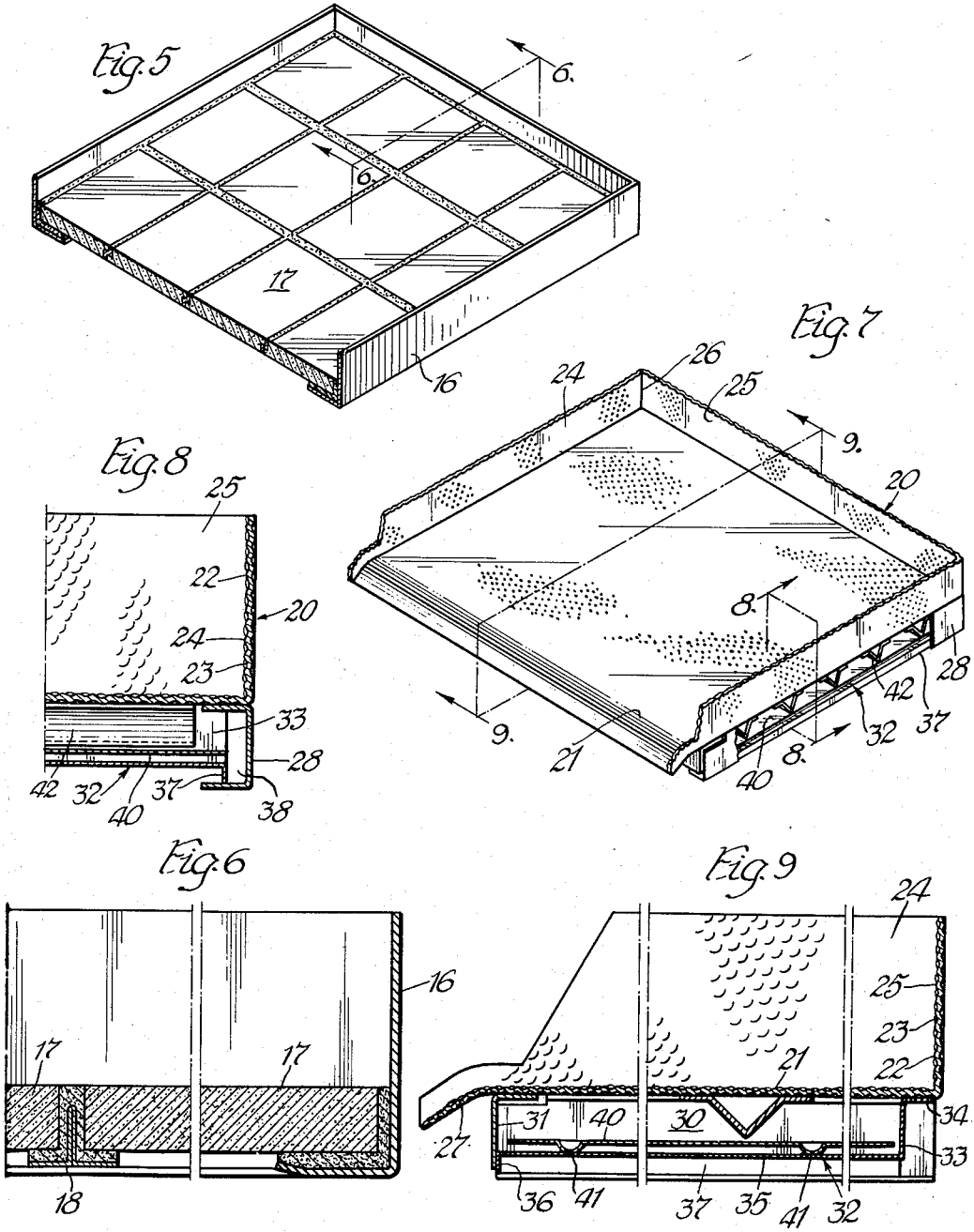
Inventor
Harold A. Michaelis
by Andrew L. Hubbard Atty.

Sept. 27, 1955 H. A. MICHAELIS 2,718,854
DECK CONSTRUCTION FOR BAKE OVENS AND THE LIKE
Filed April 27, 1951 3 Sheets-Sheet 3
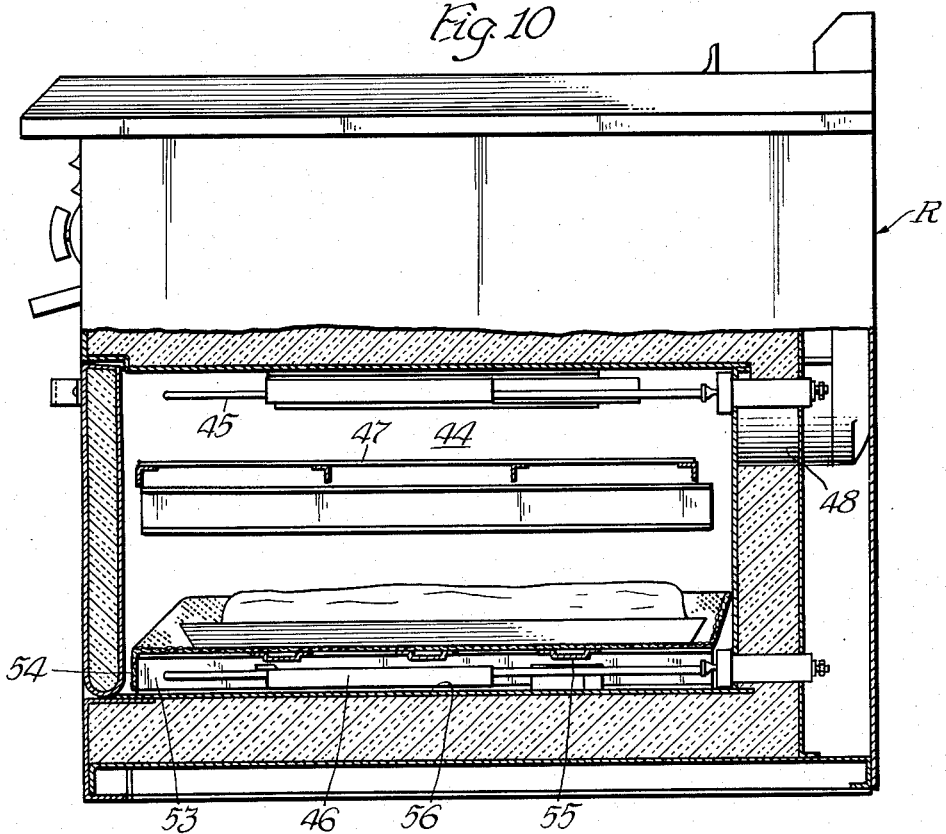
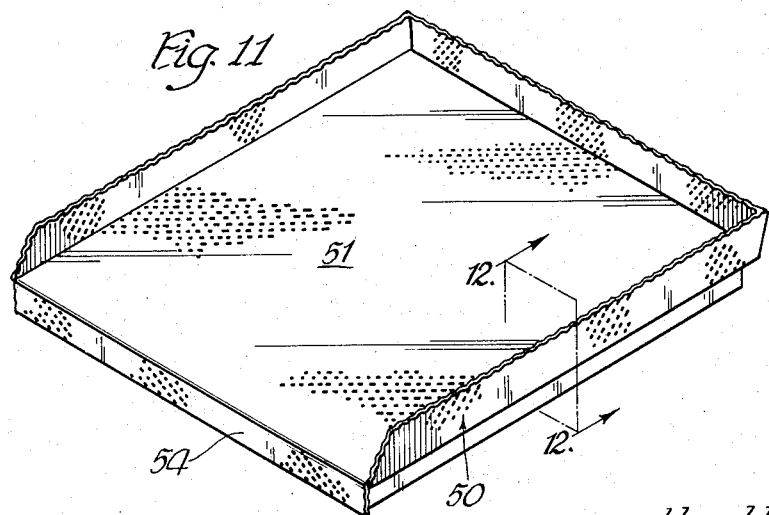
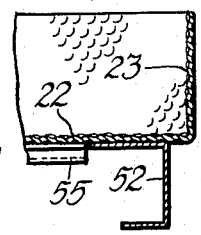
Inventor
Harold A. Michaelis
by Andrew L. Hubbard Atty.

United States Patent Office 2,718,854
Patented Sept. 27, 1955

2,718,854

DECK CONSTRUCTION FOR BAKE OVENS AND THE LIKE

Harold A. Michaelis, Elmhurst, Ill., assignor to General Electric Company, a corporation of New York Application April 27, 1951, Serial No. 223,371

9 Claims. (Cl. 107—55)

This invention relates to baking ovens, and in particular to an improved bake oven deck.

The "deck" of a bake oven is the surface on which are placed the pans containing the material being baked. Usually, the deck is supported above the floor of the oven, and in some types of oven is removable for cleaning. For many years commercial baking ovens and large institutional ovens have used decks made of ceramic tile. These were, of course, extremely heavy; in fact, the baker depended upon the mass of the deck and consequent large thermal capacity to guard against rapid temperature changes, and thus to obtain even heat distribution and compensate for improper or inadequate heat application or control. Also, the comparatively rough surface and relatively poor heat conduction of tile was effective to eliminate burned spots in goods baked in warped pans which may make contact with the deck at one or more small areas. However, the long preheating and cooling time inherent in such a massive construction presented many practical problems; for example, the baker had to plan his work to do the lowest temperature baking first and build up to the hottest work last. If necessary to return to a low temperature baking operation, the baker followed the rather haphazard procedure of supporting the work on empty bake pans to insulate it from the overhot deck.

Steel decks have been proposed, and have the advantages of less heat storage capacity and consequent adaptability to heat control systems; but in the past steel decks have not found favor in the trade because goods baked in warped pans—and there are many such pans in daily use—would show burned or overbaked spots. Apparently, the high heat conductivity of the steel deck would cause the stored heat to "rush" into the baking pan through the localized area at which a bulge or warped portion of the baking pan contacted the deck, with resulting overbaking or burning.

It is therefore a principal object of my invention to provide a metal bake oven deck having the quick response and ready controllability of earlier metal decks but providing the diffusion of heat and lower heat transfer rate of tile decks.

It is another object of my invention to provide a bake oven deck which combines the advantage of low heat capacity of metal decks with the protection against local overbaking or burning afforded by conventional tile decks.

It is yet another object of my invention to provide a metal bake oven deck which substantially eliminates burned spots in material baked in warped pans, by utilizing a novel deck surface which supports the baking pan on a large number of individually very small areas and creates many small air pockets between the pan and the deck, thus reducing the transfer of heat to the pan by direct conduction and increasing the proportion entering the pan by radiation.

It is a still further object of my invention to provide a bake oven deck which is equally adaptable and useful in commercial bake ovens and in the ovens of heavy duty ranges.

Still other objects of my invention are to provide a steel oven deck which although made of relatively light gauge metal, is sufficiently rigid for heavy work loads; which will clean easily and not absorb juices and the like which may overflow the baking pans; and which will heat uniformly without showing a heat "pattern" corresponding to the arrangement of the oven heating elements.

Other features and advantages of my invention will be apparent from the following detailed description of presently preferred embodiments, and from the accompanying drawings, in which:

Fig. 1 is a front elevation, partly in section on lines 1—1 of Fig. 2, of a bake oven having a steel deck surface embodying my invention; Fig. 2 is a side elevation of the oven, in section on lines 2—2 of Fig. 1; Fig. 3 is a fragmentary plan view of a portion of the floor of the deck; Fig. 4 is a sectional elevation of said floor portion taken on lines 4—4 of Fig. 3 and showing in broken line a curved pan bottom typical of a warped baking pan; Fig. 5 is a perspective view of a portion of a typical tile deck; Fig. 6 is a vertical elevation of a portion of the deck of Fig. 5, taken on lines 6—6 thereof; Fig. 7 is a perspective of a complete commercial bake oven deck constructed according to the teachings of my invention; Fig. 8 is a structural detail of the deck of Fig. 7, taken on lines 8—8 thereof; Fig. 9 is a fragmentary side sectional elevation of the deck of Fig. 7, taken on lines 9—9 thereof; Fig. 10 is a side elevation, partly in section, showing an electric range having an oven deck embodying my invention; Fig. 11 is a perspective of the deck of Fig. 10; and Fig. 12 is a structural detail thereof, on lines 12—12 of Fig. 11.

Fig. 1 somewhat schematically shows a bake oven of the electrically heated type having a rigid outer casing 1 and an inner casing 2 forming the actual oven space 3. The inner casing is rigidly supported in spaced relation to the outer casing or frame, and the interconnection of inner and outer structural elements indicated in Fig. 2 is generally typical of conventional construction. The floor of the inner casing may advantageously be reinforced by angle irons or ribs 4, extending transversely across the oven and suitably anchored at the side walls of the outer casing. The space between the inner and outer casings is filled with heat insulation material, as well understood. The heating element supports have been schematically indicated since neither they nor the actual oven construction have a direct relationship to the present invention. Specifically, I have represented such supports as including the respective upper and lower pairs of angle irons 5 and 6 suitably secured to the side walls of the inner casing. These angle irons carry suitable frames 7 and 8 mounting the respective upper and lower heating units 9 and 10. Said units may comprise a plurality of open coils, or the sheathed conductor type such as described and claimed in the C. C. Abbott, United States Patent 1,367,341, dated February 1, 1921. In either circumstance, there will be a plurality of heater elements 9a, 10a, arranged in a suitable pattern over the top and bottom area of the oven casing 2. It should be understood that the heat source may be gas, oil, or solid fuel; I have illustrated an electric oven only as representative of modern practice. It will also be understood that the oven is suitably vented and that dampers and other means (not shown) are provided for controlling air circulation within the oven.

An electric oven will utilize an electric circuit in which the upper and lower heating units may be individually controlled by the respective switches 11 and 12, with a conventional oven thermostat 13 comprising a master circuit control to maintain a preselected oven temperature. The oven door 14 has any conventional hinge arrangement and a channel-like base frame 15 provides a secure footing.

The angle irons or equivalent supports 6 carry the oven deck. Traditionally, oven decks have been constructed of fire brick tile, see Figs. 5 and 6, having an angle iron frame 16 about three sides and floor of tiles 17 set in fire clay cement. Suitably metallic reinforcing members 18 within the cement joints extend transversely of the frame for securement to the frame thereof. A tile deck of this type may utilize standard 9" x 9" x 1⅛" firebrick tiles, and in a common size of approximately 37" x 29" will weigh approximately 130 lbs. The relatively low conductivity of the tile and the large heat mass were desirable in the days of massive brick ovens when the baker depended on the "flywheel effect" of heat storage in the deck as a substitute for thermostatic control. Even today, when heat lag is undesirable and is incompatible with thermostatic control, some bakers prefer the relatively rough surface and low heat transfer of the tile deck because it is less liable than metal decks to burn or overbake goods in warped pans which contact the surface of the deck at limited areas.

An oven deck embodying the present invention weighs less than half of the tile deck of the same deck area. Being of metal, it has superior heat-conducting properties and yet operates satisfactorily even with warped baking pans.

The deck 20, Figs. 3 and 7, has a floor or working surface 21 formed from sheet metal, preferably sheet steel, which has been rolled or otherwise treated to produce a surface having a great many closely-spaced domes 22 separated by narrow valleys 23. The domes are of relatively small diameter, and are of substantially uniform height above the troughs of the valleys. In a sheet of .062" thickness, the maximum elevation D of the domes should be from .025" to .030"; the maximum dimension of the domes at the base should be of the order of ⅜". As indicated in Fig. 4, the convex arc of each dome may be approximately tangential to the concave arc of the adjacent trough. In practice, I have found that best results are obtained when the domes are substantially spherical segments arranged in a staggered or interfitting relationship. This makes each valley an independent pocket, so to speak, surrounded by upwardly and outwardly curving walls. As indicated in Figs. 7 to 9, the entire floor 21 presents a uniformly pebbled surface. Although it is not essential, the side walls 24 and rear wall 25 have the same surface treatment. This provides an advantageous radiation of diffused heat. It is, of course, convenient for the side and rear walls to be formed by bending up marginal portions of the main sheet and welding the walls at the rear corners 26. For a considerable distance above the floor of the deck structure, the welded joint should be grease-tight and at higher points along the corner structure the weld may be intermittent. The loading ramp 27 is formed by bending down a projecting lip of the deck.

The floor 21 is mounted on a rigid base structure which provides inherent strength, and in addition, incorporates a baffle system which insures uniformity of heating throughout the deck area. For example, I use channel iron side members 28, 30 tackwelded to the floor 21 at the side margins thereof, and a front angle member 31 also secured to the underside of the deck. The rear of this base construction is open as appears in Fig. 9. A bottom baffle plate 32 is formed from relatively light gauge metal and has a rear wall 33 and rearwardly extending flange 34, a base 35, a front wall 36, and side walls 37. The side walls support the baffle on the lower flanges of the side channels; and as shown in Fig. 8, there is an air space 38 (duplicated at the opposite side) which permits a relatively slow cross flow of air within the space defined by the bottom and rear wall of the baffle. I now prefer to use a second baffle plate 40 spaced rather closely above the base 35 and secured thereto by spotwelding the protrusions 41 to said base 35. Of course, the number of weld points between the respective baffle plates need not be large because there are no loads or stresses to be absorbed thereby. Finally, I consider it expedient to strengthen the floor 21 against bending or warpage by welding to the bottom thereof a plurality of stiffeners 42.

This baffle system establishes uniform heat distribution below the floor 21 and prevents the several heating elements of the lower heater 10 from forming a heat "pattern" which might result in uneven heating of the deck.

In Fig. 10 an electric range R may be of the type disclosed and claimed in the J. L. Shroyer U. S. Patent 2,237,795, granted April 8, 1941, for Electric Range. The oven 44 has upper and lower heating elements 45, 46 mounted for connection to a suitable power source, as more fully disclosed in said patent. The illustrated rack 47, vent 48, and other accessories are conventional.

Deck 50 is generally similar in construction to deck 20, and its floor 51 is formed from sheet metal having a similar surface treatment, by which I mean that the plurality of domes 22 and valleys 23 conform to that previously described. The floor 51 is supported on the side channels 52, 53 and a downwardly extending wall 54 overlies the front of the channels, as appear in Figs. 10 and 11. The flat channel-like stiffeners 55 are shallow to avoid contact with the lower heating unit 46. The deck rests upon the floor 56 of the oven.

In Fig. 4, I have shown on a somewhat enlarged scale a portion of an oven deck floor 21 and bottom of a baking pan P thereon. It will be noted that the domed surface transmits heat directly to the pan bottom only at the multitude of point contacts with the pan; the far greater proportion of heat transfer is by radiation from the sloping sides of the domes and some heat transfer from the heated air within the pockets. It may be considered that air is trapped between the deck and the bottom of the pan because the dome arrangement interrupts to the point of substantial elimination any air flow below the pan. In effect, the oven deck makes important usage of pockets of heated air and diffused radiation from the individual domes to transmit the heat of the deck to the baking pan. This has the practical advantage of "averaging out" the conductivity of heat to the pan, and even if the bottom of the baking pan is warped so that it is irregularly in contact with the deck, substantially uniform heat transfer to the goods within the pan is obtained. The point contact between the deck and the warped portions of the pan bottom is so small that it throttles heat flow into the pan by direct conduction, and localized overbaked or burned areas are substantially eliminated. I consider that a metal oven deck embossed substantially in the manner described above reduces the heat conduction to the baking pan to a level which makes the metal deck comparable to the tile deck in baking performance. The pebbled surface of the floor of the reck rigidifies the floor, making it practicable to use relatively light metal, with resulting reduction in mass and heat storage capacity. An oven utilizing a deck embodying the present invention is thermostatically controllable within close limits; and because its temperature may be increased or decreased relatively quickly and uniformly to suit the particular product to be baked, it is unnecessary for the baker to maintain a rigid baking schedule based on baking temperatures.

While there has been described what is at present considered to be the preferred embodiment of the invention, it will be understood that various modifications may be made therein, and it is intended to cover in the appended claims all such modifications as fall within the true spirit and scope of the invention.

I claim:

1. In a bake oven, a deck for supporting baking pans and the like, said deck including a relatively light gauge sheet metal floor having a work surface characterized by a plurality of closely adjacent rows of small, relatively shallow, dome-like protuberances of substantially uniform height, said protuberances rigidifying said floor and providing a multiplicity of individually small pan-supporting areas occupying substantially a common plane, said protuberances in each row being closely spaced and adjacent a hollow between protuberances of an adjacent row to define a plurality of small air pockets beneath said pan, the cumulative area of said air pockets being a large fraction of the area of the pan bottom, the side walls of said protuberances being substantially tangential to the remaining portions of said floor to eliminate dirt-catching crevices, means for supporting said floor above the bottom of the oven, heat baffling means carried by said floor supporting means and disposed between said floor and said oven bottom, and oven heating means disposed beneath said baffling means.

2. A bake oven deck comprising a floor on which baking pans or the like may be placed, said floor being of metal formed with a multitude of small protuberances having substantially uniform height, said protuberances having pan supporting upper portions of small area through which heat may be conducted to the bottom of the baking pan, the bases of said protuberances merging to form air pockets bounded by radiating surfaces sloping upwardly toward said top areas.

3. A bake oven deck comprising a floor on which baking pans or the like may be placed, said floor being of sheet metal formed with a multitude of closely adjacent protuberances having a substantially uniform height, said protuberances providing a plurality of closely spaced pan-supporting points of minute area through which heat may be conducted to the bottom of the baking pan, and the bases of said protuberances merging to form air pockets bounded by radiating surfaces sloping upwardly toward said points.

4. A bake oven deck comprising a floor on which baking pans or the like may be placed, said floor being of sheet metal formed with a multitude of closely adjacent protuberances having a substantially uniform height, said protuberances providing a multitude of closely spaced pan-supporting points of minute area through which heat may be conducted to the bottom of the baking pan, adjacent rows of said protuberances being in a staggered relation, and the bases of the protuberances in said adjacent rows merging to form air pockets bounded by radiating surfaces sloping upwardly toward said points.

5. A bake oven deck comprising a floor on which baking pans or the like may be placed, said floor being of sheet metal formed with a multitude of closely adjacent, substantially spherical domes having a substantially uniform height, said domes providing a plurality of closely spaced pan-supporting points of minute area through which heat may be conducted to the bottom of the baking pan, adjacent rows of said domes being in a staggered relation, and the bases of said domes in said adjacent rows merging to form air pockets bounded by radiating surfaces sloping upwardly toward said points.

6. A bake oven deck as defined in claim 5 and in which the maximum height of said domes is of the order of 0.080 times the base diameter thereof.

7. A bake oven deck comprising a floor on which baking pans or the like may be placed, said floor being of sheet metal formed with a multitude of closely spaced rounded protuberances having a substantially uniform height which is a small fraction of the base diameter thereof, said protuberances providing a multitude of closely spaced pan-supporting points of minute area through which heat may be conducted to the bottom of the baking pan, and the bases of said protuberances merging to form air pockets bounded by radiating surfaces sloping upwardly on a small angle toward said points.

8. In a bake oven, a deck for supporting baking pans and the like, said deck including a flat sheet metal floor having a work surface characterized by a plurality of small, relatively shallow, dome-like protuberances of substantially uniform height providing a multiplicity of individually small pan-supporting areas, said protuberances being closely spaced and defining a plurality of small air pockets disposed relatively uniformly with respect to the area of the bottom of the pan to radiate heat in a diffused pattern thereagainst, side and rear wall means on said deck being provided with similarly shaped and arranged protuberances, means for supporting said deck above the bottom of said oven, and means disposed below said deck for heating the floor thereof.

9. In a bake oven, a deck for supporting baking pans and the like, said deck including a sheet metal floor having a work surface characterized by a plurality of rows of small, relatively low, substantially spherical, protuberances of substantially uniform height, said protuberances rigidifying said floor and providing a multiplicity of individually minute pan-engaging areas which are substantially tangent to the bottom of the pan supported thereon and disposed in substantially a common plane, said protuberances being closely spaced in each row and adjacent rows being in a staggered relation in which groups of protuberances in adjacent rows establish small air pockets beneath said pan, said air pockets being defined by upwardly sloping heat radiating surfaces, the cumulative area of said air pockets being very much greater than the total of the pan-engaging areas, means for supporting said deck above the bottom of the oven cavity, and means for heating said oven.

References Cited in the file of this patent

UNITED STATES PATENTS

| | | |
|---|---|---|
| 273,004 | Anderson | Feb. 27, 1883 |
| 2,262,692 | Meacham | Nov. 11, 1941 |